United States Patent
Nagao

(10) Patent No.: US 9,202,320 B2
(45) Date of Patent: Dec. 1, 2015

(54) EVENT INFORMATION COLLECTING SYSTEM FOR VEHICLE AND METHOD FOR COLLECTING EVENT INFORMATION ON VEHICLE

(75) Inventor: Tomoki Nagao, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 780 days.

(21) Appl. No.: 12/756,255

(22) Filed: Apr. 8, 2010

(65) Prior Publication Data
US 2010/0305812 A1 Dec. 2, 2010

(30) Foreign Application Priority Data

May 26, 2009 (JP) ................................ 2009-126602

(51) Int. Cl.
G07C 5/08 (2006.01)
G07C 5/00 (2006.01)
B60R 21/013 (2006.01)

(52) U.S. Cl.
CPC ............... *G07C 5/085* (2013.01); *B60R 21/013* (2013.01); *G07C 5/008* (2013.01); *G07C 5/08* (2013.01)

(58) Field of Classification Search
CPC .......... G07C 5/08; G07C 5/008; G07C 5/085; B60R 21/013
USPC .......... 701/29.1, 29.6, 31.7–31.8, 32.2–32.5, 701/32.7, 33.2–33.4; 340/438
See application file for complete search history.

(56) References Cited

U.S. PATENT DOCUMENTS

| | | | | |
|---|---|---|---|---|
| 4,638,289 | A * | 1/1987 | Zottnik | 246/45 |
| 5,802,545 | A * | 9/1998 | Coverdill | 701/33.4 |
| 6,246,933 | B1 * | 6/2001 | Bague | 701/32.2 |
| 6,356,824 | B1 * | 3/2002 | Chene et al. | 701/29.3 |
| 6,535,802 | B1 * | 3/2003 | Kramer | 701/29.1 |
| 6,549,014 | B1 * | 4/2003 | Kutkut et al. | 324/426 |
| 6,678,612 | B1 * | 1/2004 | Khawam | 701/32.4 |
| 6,741,896 | B1 * | 5/2004 | Olzak et al. | 700/82 |
| 7,348,895 | B2 * | 3/2008 | Lagassey | 340/907 |
| 2005/0083404 | A1 * | 4/2005 | Pierce et al. | 348/148 |
| 2007/0038343 | A1 * | 2/2007 | Larschan et al. | 701/29 |
| 2007/0109106 | A1 * | 5/2007 | Maeda et al. | 340/426.1 |
| 2008/0088482 | A1 * | 4/2008 | Okada et al. | 340/937 |
| 2008/0152136 | A1 * | 6/2008 | Kashihara | 380/200 |
| 2008/0255723 | A1 * | 10/2008 | Sano | 701/35 |

FOREIGN PATENT DOCUMENTS

JP 07262099 A 10/1995
JP 08093544 A 4/1996

(Continued)

*Primary Examiner* — John Q Nguyen
*Assistant Examiner* — Michael Ng
(74) *Attorney, Agent, or Firm* — Dinsmore & Shohl LLP

(57) ABSTRACT

An event information collecting system installed on a vehicle includes a status information acquiring device that acquires and generates vehicle status information, a control device that receives the vehicle status information generated from the status information acquiring device, a storage device connected to the control device, a main power supply that supplies electric power to the control device, and an auxiliary power supply that supplies electric power to the control device when supply of power from the main power supply is stopped. In the event information collecting system, the control device stores, in the storage device, the vehicle status information generated from the status information acquiring device and a condition of power supply from the main power supply, at the time of occurrence of a given event.

8 Claims, 8 Drawing Sheets

(56) References Cited

FOREIGN PATENT DOCUMENTS

| | | | |
|---|---|---|---|
| JP | 09-062885 A | 3/1997 |
| JP | 2000-335451 A | 12/2000 |
| JP | 2003-252256 A | 9/2003 |
| JP | 2008094252 A | 4/2008 |

* cited by examiner

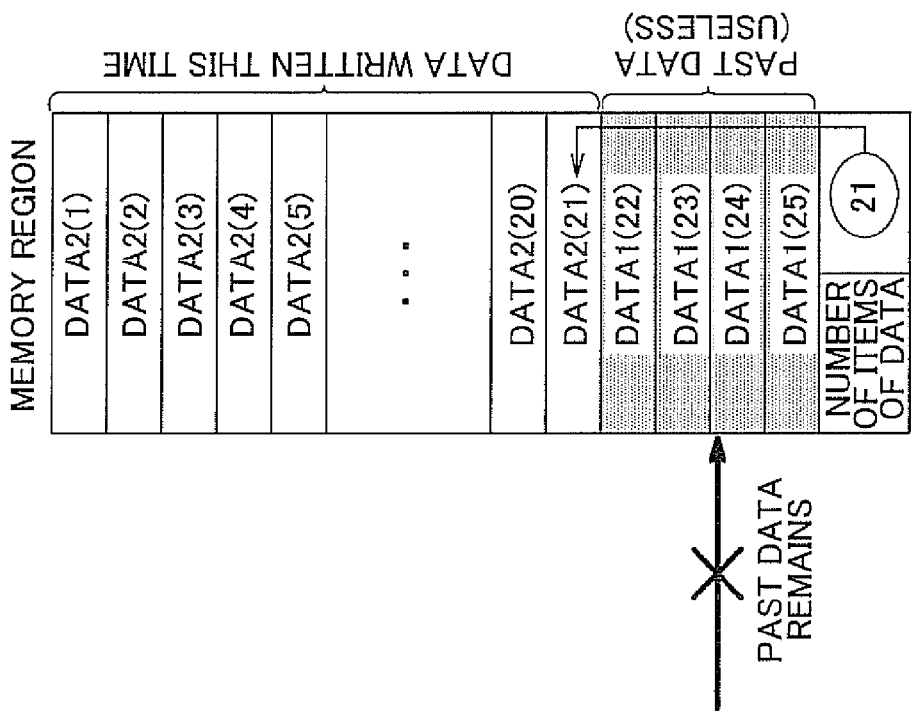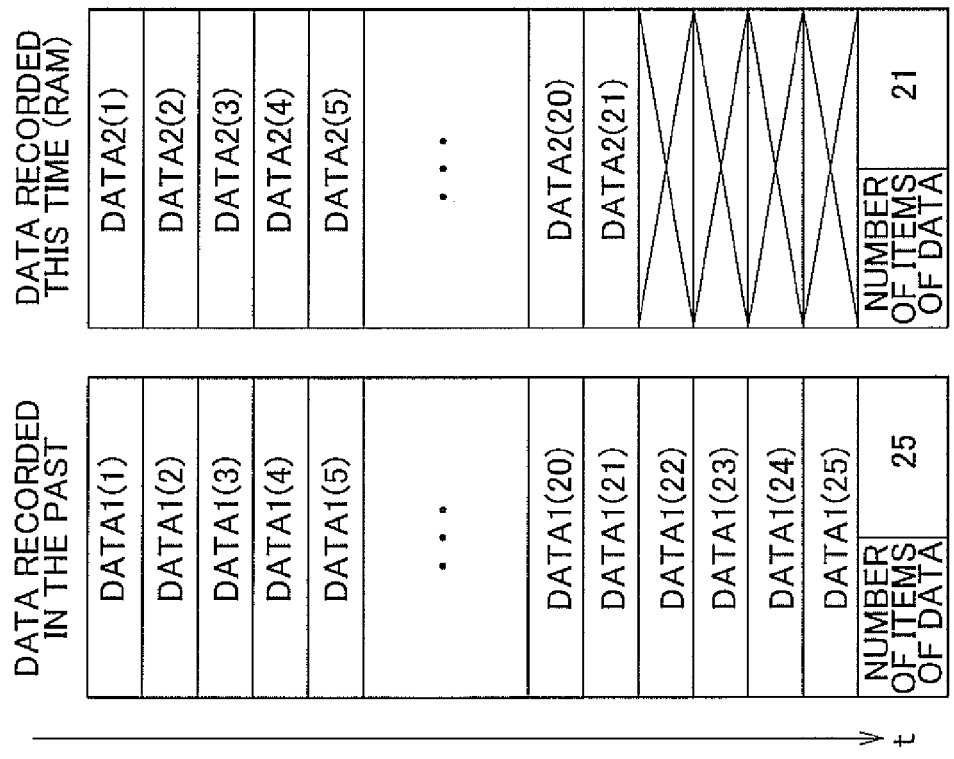

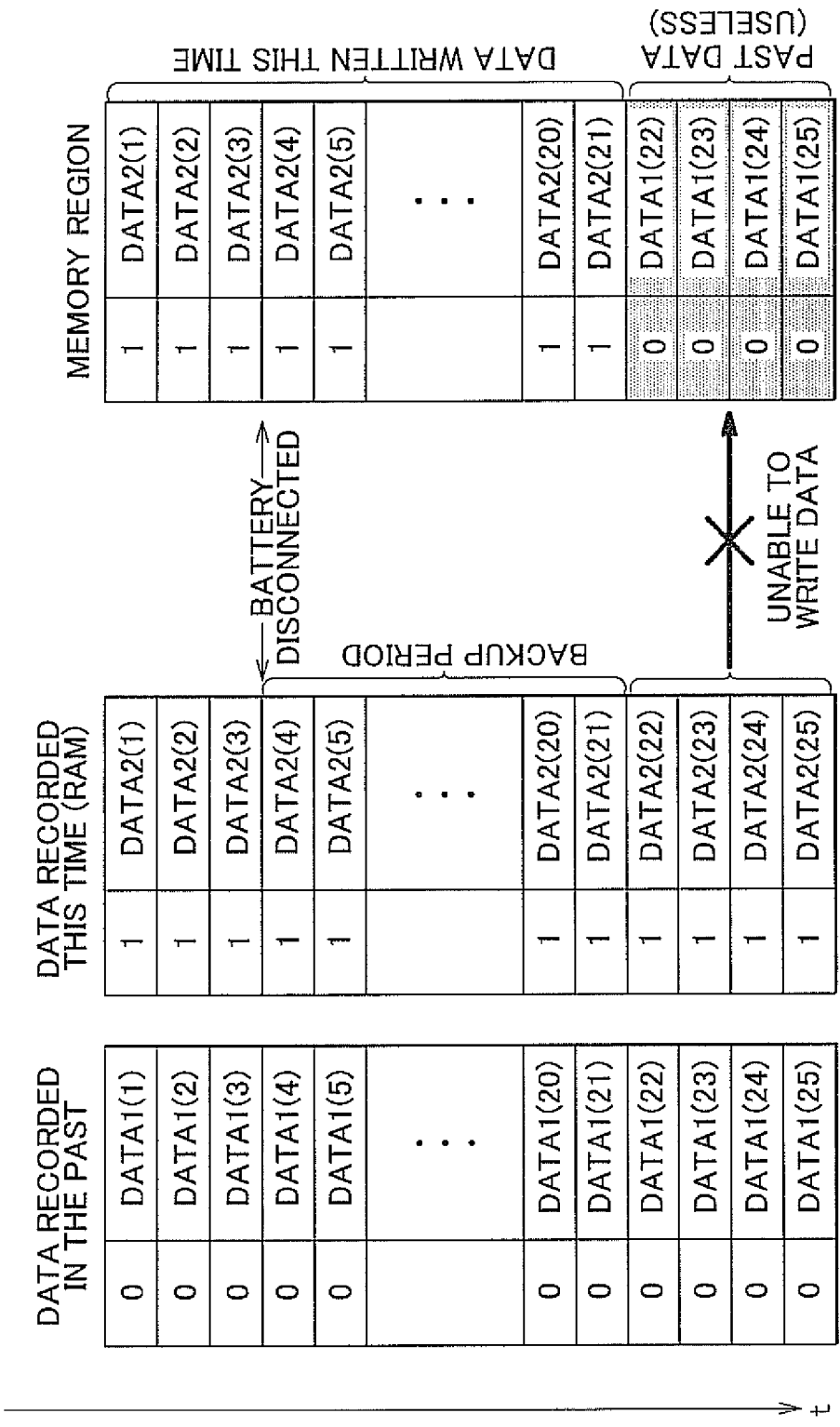

FIG.8

DEFAULT : LABEL=0

| RECORDING TIME | LABEL | RECORDING REGION | LABEL PROVIDED UPON WRITING INTO EACH REGION | | |
|---|---|---|---|---|---|
| | | | A | B | C |
| NO RECORDING | - | - | 0 | 0 | 0 |
| FIRST | 1 | A | 1 | 0 | 0 |
| SECOND | 2 | B | 1 | 2 | 0 |
| THIRD | 3 | C | 1 | 2 | 3 |
| FOURTH | 4 | A | 4 | 2 | 3 |
| FIFTH | 1 | B | 4 | 1 | 3 |
| SIXTH | 2 | C | 4 | 1 | 2 |
| SEVENTH | 3 | A | 3 | 1 | 2 |
| EIGHTH | 4 | B | 3 | 4 | 2 |
| NINTH | 1 | C | 3 | 4 | 1 |

EVENT INFORMATION COLLECTING SYSTEM FOR VEHICLE AND METHOD FOR COLLECTING EVENT INFORMATION ON VEHICLE

INCORPORATION BY REFERENCE

The disclosure of Japanese Patent Application No. 2009-126602 filed on May 26, 2009 including the specification, drawings and abstract is incorporated herein by reference in its entirety.

BACKGROUND OF THE INVENTION

1. Field of the Invention

The invention relates to an event information collecting system for a vehicle which stores status information in a storage medium when a problem arises in a vehicle (including vehicle-mounted devices) or when an accident occurs, for example, so that the stored information can help in the determination of the cause of the problem or accident. The invention also relates to such a method for collecting event information on a vehicle.

2. Description of the Related Art

When an event occurs in a vehicle, such as when a problem arises in the vehicle or an accident occurs, information concerning the status of the vehicle, which includes sensor output values and control computation values, is stored in a nonvolatile storage medium, or the like. The information thus stored can help later in the determination of the cause of the problem or cause of the accident at a repair shop, or the like.

The determination of the cause of the problem or accident as described above is called "self diagnosis", for example. Generally, a control device, such as ECU (electronic control unit), for controlling the vehicle caries out processing for storing information for use in the self diagnosis, concurrently with its original vehicle controls.

The storage medium in which the information is stored in the above manner is called "event data recorder", for example. According to the laws and regulations of certain countries, it is made mandatory to install an event data recorder on the vehicle.

In this connection, a data recorder (as described in, for example, Japanese Patent Application Publication No. 2008-94252 (JP-A-2008-94252)) detects a driver's operation or operations on the vehicle and the operating state of the vehicle, and determines whether the detected driver's operation(s) and vehicle operating state should be recorded into status recording means, based on at least the driver's operation(s). As one example of the determination as described in the above-identified publication, the driver's operations and vehicle operating state are recorded under conditions that the accelerator pedal is operated and that the foot brake is operated.

In the meantime, the above type of device, which is a vehicle-mounted device, is unlikely to include a dedicated storage medium having an unlimited storage region, and status information of the vehicle is normally written into and stored in a limited storage region while overwriting previously stored information present in the storage region. In the data recorder as described in JP-A-2008-94252, new vehicle status data is recorded into a temporary storage unit while at the same time old vehicle status data is erased or eliminated.

Accordingly, there may arise some occasions where the boundary between the information collected in the present control cycle and the information stored in the last cycle or earlier becomes obscure or unclear. As a result, the past unnecessary information may be recognized as the information collected in the present control cycle, which may result in an erroneous determination made in the later self diagnosis, or may make it impossible to analyze the information.

SUMMARY OF THE INVENTION

The invention provides an event information collecting system for a vehicle which can store necessary information in a limited storage region in such a manner as to make the information distinguishable, and also provide a method for collecting event information on a vehicle, using such a system.

A first aspect of the invention is concerned with an event information collecting system installed on a vehicle. The event information collecting system includes a status information acquiring device that acquires and generates vehicle status information, a control device that receives the vehicle status information generated from the status information acquiring device, a storage device connected to the control device, a main power supply that supplies electric power to the control device, and an auxiliary power supply that supplies electric power to the control device when supply of power from the main power supply is stopped. In this system, the control device stores, in the storage device, the vehicle status information generated from the status information acquiring device and a condition of power supply from the main power supply, at the time of occurrence of a given event.

According to the first aspect of the invention, the vehicle status information generated from the status information acquiring device and the condition of power supply from the main power supply, at the time of occurrence of a given event, are stored in the storage device; therefore, the necessary information can be stored in such a manner as to make the information distinguishable.

A second aspect of the invention is concerned with a method for collecting event information on a vehicle, using a system including a control device, a storage device connected to the control device, a main power supply that supplies electric power to the control device, and an auxiliary power supply that supplies electric power to the control device when supply of power from the main power supply is stopped. The method for collecting information on the vehicle includes the steps of: acquiring vehicle status information, determining whether a given event occurred, and storing the acquired vehicle status information and a condition of power supply from the main power supply in the storage device when it is determined that the given event occurred.

According to the invention, there are provided the event information collecting system that can store necessary information in a limited storage region in such a manner as to make the information distinguishable, and the method for collecting event information, using the system.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 6A-6C are views showing the manner of providing the number of items of data stored this time in the storage device to a storage region of the storage device;

FIGS. 7A-7C are views showing the manner of adding an identifying label to each item of data; and FIG. 8 is a view showing the manner of adding N+1 different labels to respective sets of data in cycles where there are N pieces of storage regions in the storage device.

DETAILED DESCRIPTION OF EMBODIMENTS

In the following, one embodiment of the invention will be described with reference to the accompanying drawings.

An event information collecting system 1 for a vehicle according to one embodiment of the invention will be described. The vehicular event information collecting system 1 includes a control device, such as an ECU (electronic control unit) that performs various vehicle controls (e.g., engine control, brake control, steering control and shift control), and the control device, such as ECU, is configured to carry out information collection processing, concurrently with its original processing. It is to be understood that a dedicated device used exclusively for information collection processing may be provided as another device, in addition to the above-mentioned control device.

Figure 1:
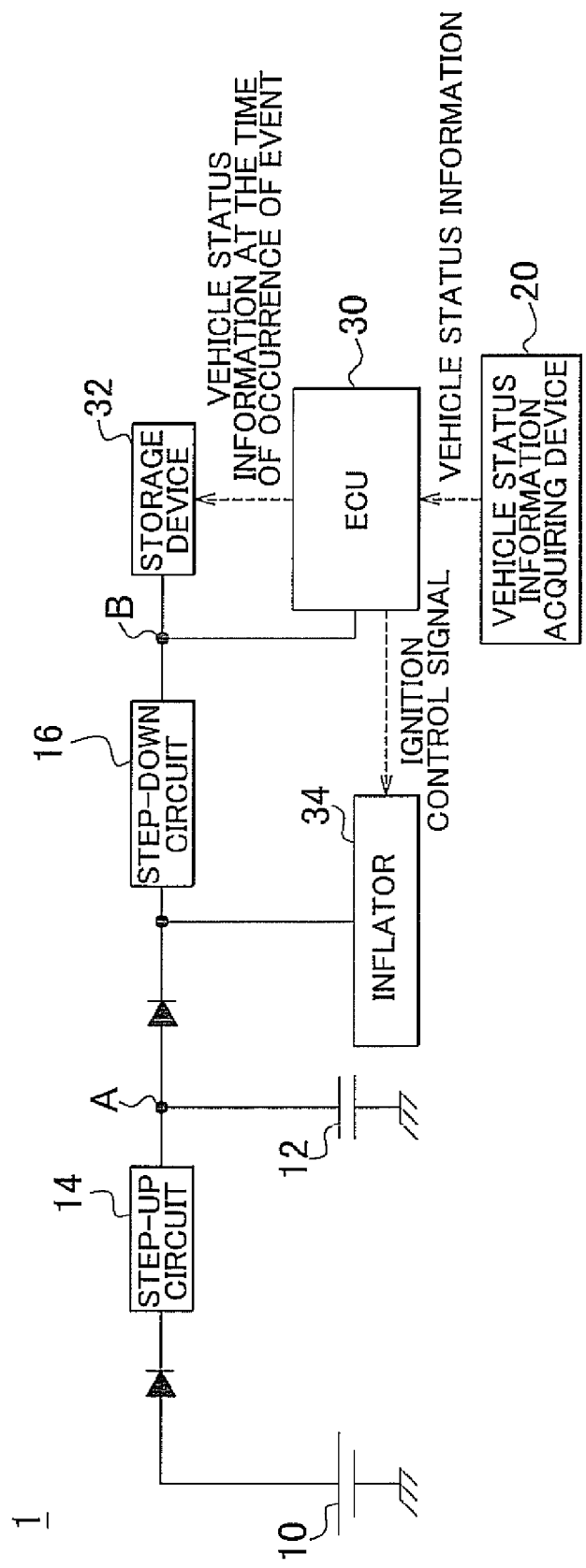
FIG. 1 is a view showing an example of the system configuration of an event information collecting system for a vehicle according to one embodiment of the invention.

FIG. 1 shows an example of the system configuration of the vehicular event information collecting system 1 according to one embodiment of the invention. The information event collecting system 1 includes, as main components, a battery 10, capacitor 12, vehicle status information acquiring device 20, ECU 30, and a storage device 32.

The storage device 32 may be incorporated in the ECU 30. The vehicle status information acquiring device 20 and the ECU 30 are connected to each other via, for example, multiplex communication lines, and carry out information communications, using communications protocols, such as CAN (Controller Area Network), low-speed communications protocols for body control, typified by LIN (Local Interconnect Network), multi-media communications protocols typified by MOST (Media Oriented Systems Transport), and FlexRay.

The battery 10 is, for example, a lead storage battery. The battery 10 is charged by an alternator (not shown) that is connected to the crankshaft as the output shaft of the engine via a belt and a pulley, and supplies electric power to the ECU 30 and other vehicle-mounted equipment or devices.

The capacitor 12 is an auxiliary power supply for supplying electric power to the ECU 30 and others, when supply of power from the battery 10 is stopped.

The vehicle status information acquiring device 20 includes, for example, a water temperature sensor, various pressure sensors, vehicle speed sensor, voltage sensor, G sensor, yaw rate sensor, acceleration stroke sensor, throttle angle sensor, brake depression amount sensor (e.g., master pressure sensor), shift position switch, and so forth. The ECU 30 receives sensor output values from these sensors. This arrangement is schematically shown in FIG. 1 for simple representation; however, the sensor output values may be transmitted to the ECU 30 via another ECU or a gateway computer, for example.

The ECU 30 is a microcomputer in which CPU (Central Processing Unit), ROM (Read Only Memory), RAM (Random Access Memory), etc. are connected to each other via a bus, and further includes a flash memory, a storage device, such as HDD (Hard Disk Drive), I/O port, timer, counter, and so forth.

In this embodiment, the ECU 30 serves as a control device that controls deployment of an air bag, and an inflator 34 is shown in FIG. 1 as a typical object to be controlled. When the acceleration in the longitudinal direction of the vehicle, which is detected by the G sensor, becomes equal to or greater than a predetermined value, the ECU 30 generates an ignition command signal to the inflator 34 so as to deploy the air bag.

The ECU 30 is not limited to the control device that performs the air-bag deployment control, but may also serve as a control device that performs engine control, a control device that performs brake control, a control device that performs steering control, and the like.

The storage device 32 is a readable and writable, nonvolatile storage device, such as EEPROM (Electrically Erasable and Programmable Read Only Memory). The storage device 32 is not limited to this type of device, but may be in the form of NVRAM (Non Volatile RAM) formed by incorporating a small battery into SRAM (Static Random Access Memory) or placing the battery outside SRAM, a magnetic disk, a magnetic tape, or the like.

The battery 10 is connected to a terminal A via a step-up circuit 14. The step-up circuit 14 boosts the supply voltage of the battery 10 to, for example, about 12V or 24V, and supplies the boosted voltage to devices connected to the terminal A.

The capacitor 12, a step-down circuit 16 and the inflator 34 are connected to the terminal A. While electric power is supplied from the battery 10 to the terminal A, the capacitor 12 is kept in an almost fully charged state.

On the other hand, if the power supply from the battery 10 to the terminal A is stopped through control of a system main relay (not shown), or the like, or due to a problem, such as a broken wire, the capacitor 12 starts discharging. In this case, electric power is supplied for a short period of time from the capacitor 12 to the step-down circuit 16, inflator 34, etc. connected to the terminal A.

The step-down circuit 16 steps down the voltage supplied from the step-up circuit 14 or capacitor 12, to a voltage of about 5V, for example, and supplies the resulting voltage to the ECU 30 and the storage device 32.

With the voltage supplied from the step-up circuit 14 or capacitor 12, the inflator 34 operates to ignite an internal explosive, so as to eject gas for deploying the air bag.

The ECU 30 carries out processing for operating the storage device 32 as an event data recorder, while executing the air-bag deployment control.

More specifically, information (pre-event data), such as the vehicle speed V, accelerator pedal position AC, and a determination as to whether the brake pedal is depressed, before a given point in time at which an accident, or the like, is presumed to happen, and information (post-event data), such as a differential value $\Delta V$ of the vehicle speed V and a condition of power supply from the battery, after the given point in time are stored in the RAM. Then, if it is determined later that an accident, or the like, actually happened at the given point in time, the information stored in the RAM is copied to the storage device 32, so that the information helps in the determination of the cause of the accident or the cause of a failure at a later time. The above-indicated information is one example of the vehicle status information mentioned in the SUMMARY OF THE INVENTION.

The condition of power supply from the battery 10 may be grasped or acquired from an output value of a voltage sensor, or the like, incorporated in the step-up circuit 14, or may be grasped from the input voltage of the ECU 30. Also, the condition of power supply from the battery 10 may be grasped from an output value of a sensor that detects the voltage of the terminal A, or may be grasped from a status signal received from another control device that controls the system main relay.

Figure 2:
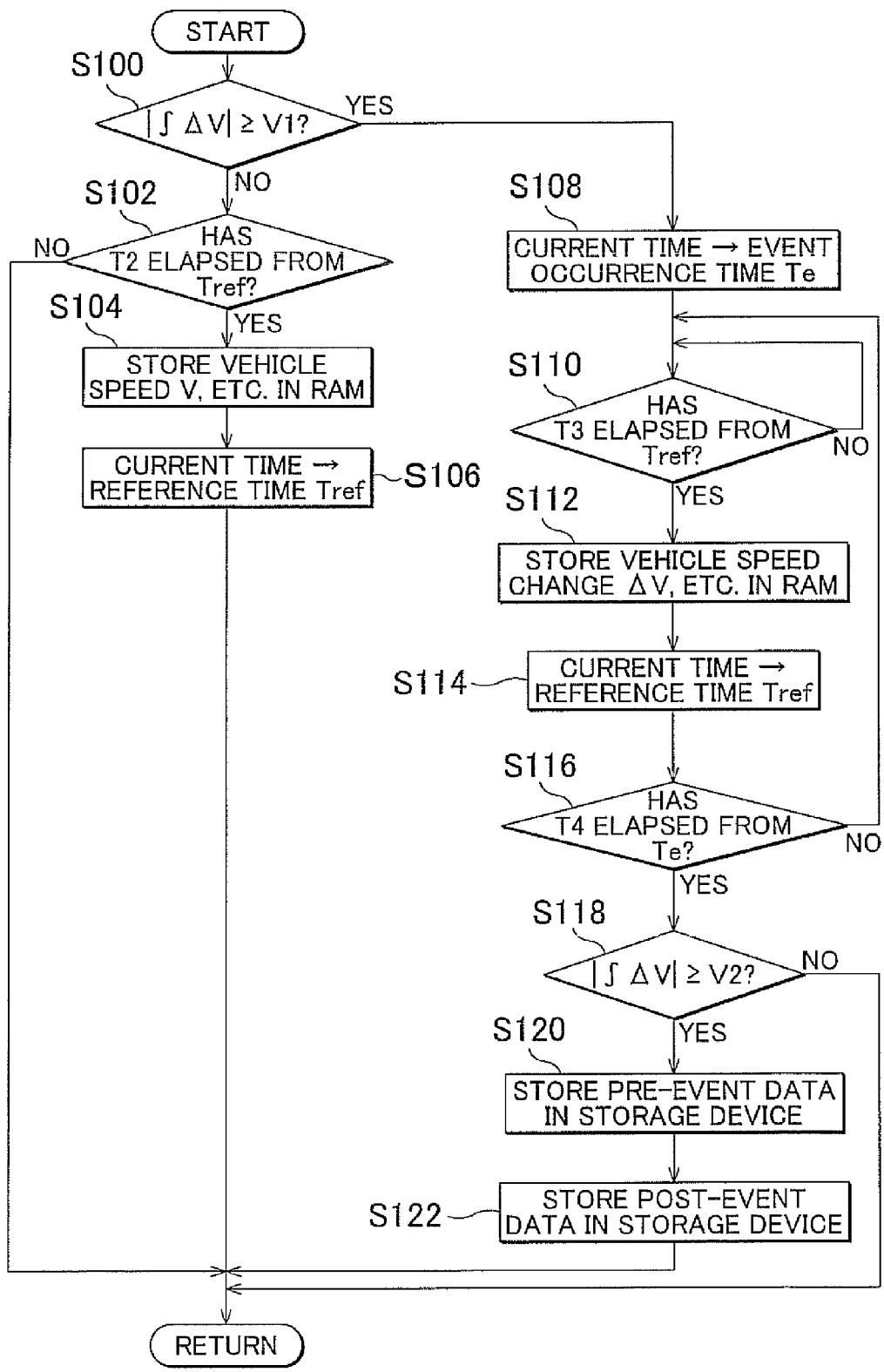
FIG. 2 is a flowchart illustrating the flow of a control routine executed by ECU of the event information collecting system according to the above-indicated one embodiment of the invention

FIG. 2 is a flowchart that illustrates the flow of a control routine executed by the ECU 30 of the event information collecting system according to the embodiment of the invention. The routine illustrated in the flowchart of FIG. 2 is repeatedly executed while the vehicle on which the event information collecting system is installed is running (or while the vehicle system is in the ON state).

It is assumed that the ECU 30 calculates differential values ΔV of the vehicle speed V received from the vehicle speed sensor at predetermined sampling intervals, and stores the differential values in the RAM for a certain period of time, concurrently with execution of the routine of FIG. 2.

Initially, the ECU 30 determines whether the absolute value of the integral of ΔV (i.e., the absolute value of speed change) over a first predetermined time (e.g., on the order of several dozens of milliseconds) T1 is equal to or greater than a first predetermined speed V1 (e.g., on the order of several hundreds of meters per hour), during a period from the last cycle of the routine of FIG. 2 to the current cycle (S100).

If a negative decision (NO) is obtained in step S100, the ECU 30 determines whether a second predetermined time (e.g., on the order of several hundreds of milliseconds) T2 has elapsed from a reference time Tref set the last time, referring to an internal timer (S102). If the second predetermined time T2 has not elapsed from the reference time Tref set the last time, the ECU 30 finishes the current cycle of the routine without performing any operation.

In this connection, the time at which the vehicle system is turned on is set as the initial value to the reference time Tref.

If the second predetermined time T2 has elapsed from the reference time Tref set the last time, the ECU 30 stores information, such as the vehicle speed V, accelerator pedal position AC, and a determination as to whether the brake pedal is depressed, in the RAM (S104). Then, the ECU 30 sets the current time to the reference time Tref (S106), and finishes the current cycle of the routine.

If an affirmative decision (YES) is obtained in step S100, on the other hand, the ECU 30 executes a process (steps S108-S122) subsequent to the occurrence of an event as described below.

Initially, the ECU 30 sets the current time to an event occurrence time Te (S108).

Next, the ECU 30 waits until a third predetermined time (e.g., on the order of several dozens of milliseconds) T3 elapses from the reference time Tref set the last time, referring to the internal timer (S110).

If the third predetermined time T3 elapses from the reference time Tref set the last time, the ECU 30 stores a change ΔV in the vehicle speed from the last reference time Tref, and the condition of power supply from the battery 10 at this point in time (e.g., whether the system is in the ON state in which electric power is supplied from the battery 10 or in the OFF state in which no power is supplied from the battery 10), in the RAM (S112). Then, the ECU 30 sets the current time to the reference time Tref (S114).

Subsequently, the ECU 30 determines whether a fourth predetermined time (e.g., on the order of several hundreds of milliseconds) T4 has elapsed from the event occurrence time Te (S116). If the fourth predetermined time T4 has not elapsed from the event occurrence time Te, the control returns to step S110.

If the fourth predetermined time T4 has elapsed from the event occurrence time Te, the ECU 30 determines whether the absolute value of the integral of ΔV is equal to or greater than a second predetermined speed V2 over a period from the event occurrence time Te to the expiration of a fifth predetermined time (e.g., about one hundred and several dozens of milliseconds) T5 (S118).

If the absolute value of the integral of ΔV over the period from the event occurrence time Te to the expiration of the fifth predetermined time T5 is less than the second predetermined speed V2, the ECU 30 determines that no accident, or the like, occurred even though an affirmative decision (YES) was obtained in step S100 due to a temporary change in the vehicle speed, and finishes the current cycle of the routine without performing any further operation. As a result, the collected data is merely stored in the RAM and will not be stored in the storage device 32.

If, on the other hand, the absolute value of the integral of ΔV over the period from the event occurrence time Te to the expiration of the fifth predetermined time T5 is equal to or greater than the second predetermined speed V2, the ECU 30 determines than an accident, or the like, actually occurred. In this case, the ECU 30 transfers the information (pre-event data), such as the vehicle speed V, accelerator pedal position AC, and a determination as to whether the brake pedal is depressed, which had been stored in the RAM from the time several seconds before the event occurrence time Te to the event occurrence time Te, to the storage device 32 (S120). Subsequently, the ECU 30 transfers the information (post-event data), such as ΔV and the condition of power supply from the battery 10, stored in the RAM after the event occurrence time T2, to the storage device 32 (S122).

Figure 3:
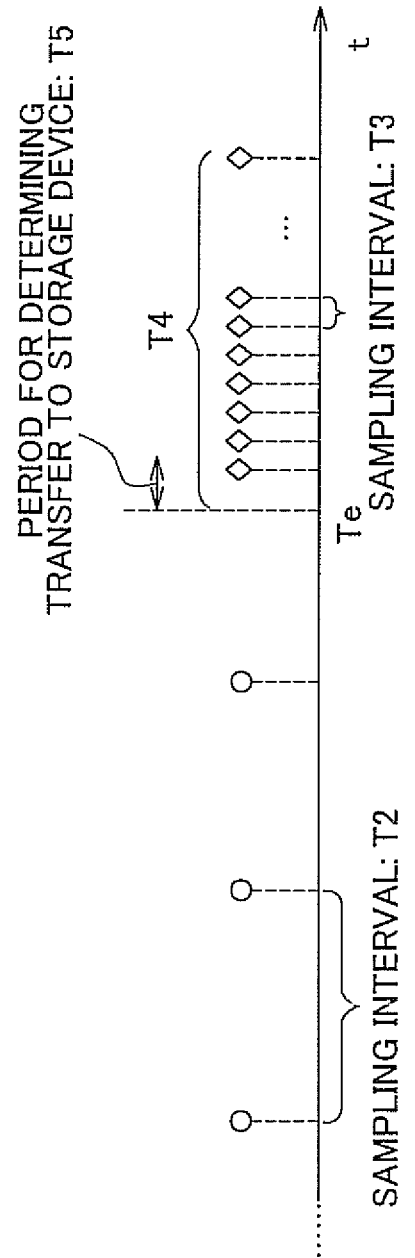
FIG. 3 is a view showing vehicle status information acquired by executing the routine illustrated in FIG. 2, with respect to time.

FIG. 3 is a view showing the vehicle status information acquired by executing the routine illustrated in FIG. 2, with respect to time. As shown in FIG. 3, the information, such as the vehicle speed V, is collected at sampling intervals of the second predetermined time T2, up to the event occurrence time Te. During a period from the event occurrence time Te to the expiration of the fourth predetermined time T4, the information, such as a change ΔV in the vehicle speed, is collected at sampling intervals of the third predetermined time T3. Thus, the cause of an accident or a failure can be determined by analyzing the thus collected information later.

In the storage device 32, the vehicle status information collected in the manner as described above is written over previous information present in a given region, and stored in the given region. Namely, the collected vehicle status information is stored in a given region of the storage device 32 in a repeated write-over mode. More specifically, two regions, i.e., a region for pre-event data and a region for post-event data, are prepared in the storage device 32, for example, and the two regions are alternately used to store information each time new vehicle status information is acquired.

It is possible to save the time of erasing data by storing data in the repeated write-over mode as described above. This is because writing of data may be delayed if previous data is erased upon or after the occurrence of an accident, or the like. If data is erased at another occasion, there is a possibility that data is lost or eliminated before the cause of an accident or a failure is determined. If data is stored in the repeated write-over mode as described above, the problem of data loss before the cause of accident or failure is determined can be avoided.

However, if the data is stored in the write-over mode, it may be difficult to distinguish the data stored this time from previous data stored in the past. In the event information collecting system 1 of this embodiment, therefore, the condition of power supply from the battery 10 is included in the post-event data. This makes it possible to determine the time or point at which useless past data is started.

Figure 4:
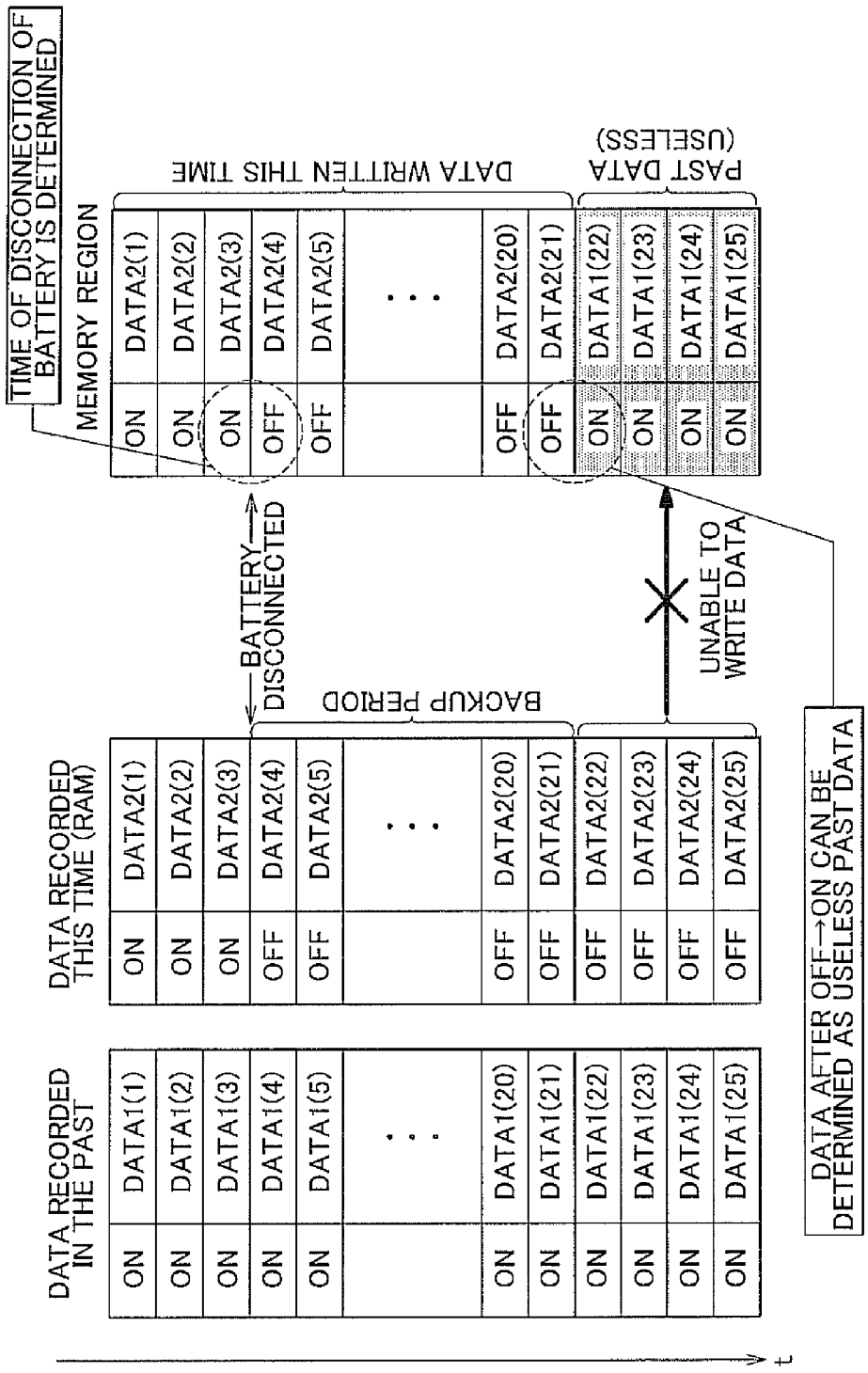
FIGS. 4A-4C are views showing data stored in such a manner as to make it possible to determine the time or point at which useless past data is started.

FIGS. 4A-4C are views showing data stored in such a manner as to make it possible to determine the time or point at which useless past data is started. More specifically, FIG. 4A shows data stored in the storage device 32 and associated with an event that occurred in the past, and FIG. 4B shows data stored in the RAM and associated with an event in question detected in the present cycle. In FIGS. 4A-4C, the time denoted as "BATTERY DISCONNECTED" is the time at which power supply from the battery 10 ends, and the range denoted as "BACKUP PERIOD" is a period of time from the time at which the power supply from the battery 10 ends to the time at which power supply from the capacitor 12 ends.

FIG. 4C shows data stored in the storage device 32 in the present cycle of the routine. As shown in FIG. 4C, a string of data indicating the condition of power supply from the battery 10 consists of "OFF" in the backup period, and it can be thus determined that switching from "OFF" to "ON" in the data indicating the power supply condition represents the boundary between the data obtained this time and the past data.

The above-describe effect can be yielded owing to the arrangement of the system which includes the capacitor 12 that supplies electric power to the ECU 30 when power supply from the battery 10 is stopped.

Figure 5:
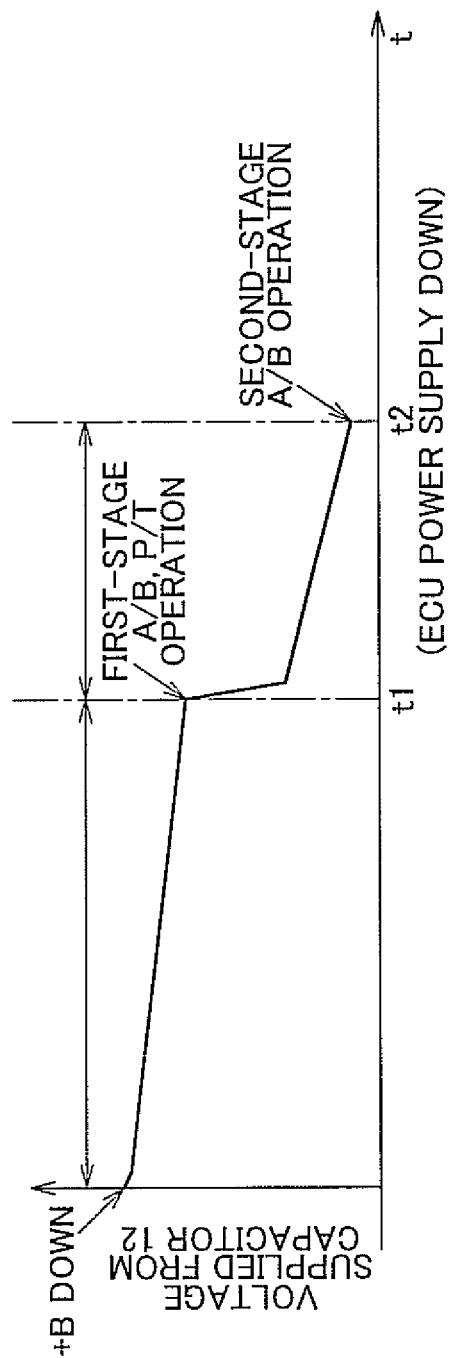
FIG. 5 is a view showing changes in the voltage supplied from a capacitor in the case where supply of electric power from a battery stops at the time of occurrence of an accident, and air-bag deployment control and an information collecting operation are performed with electric power supplied from the capacitor.

FIG. 5 shows changes in the voltage supplied from the capacitor 12 in the case where power supply from the battery 10 is stopped upon the occurrence of an accident, and air-bag deployment control and information collection processing are carried out with electric power supplied from the capacitor 12. In FIG. 5, "+B DOWN" indicates the time at which the power supply from the battery 10 is stopped. As shown in FIG. 5, the voltage supplied from the capacitor 12 gradually decreases from the time when the power supply from the battery 10 is stopped. Then, the first stage of air-bag deployment and operation of a pretensioner take place at time t1, and the second stage of air-bag deployment takes place at time t2. Thereafter, the voltage supplied from the capacitor 12 reaches the ground level.

The supply of electric power to the ECU 30 stops at time t2. Accordingly, the capacity, etc. of the capacitor 12 may be designed in advance, so that the time t2 coincides with the time at which the fourth predetermined time T4 elapses from the event occurrence time Te and writing of data into the storage device 32 is completed.

The vehicular event information collecting system of this embodiment as described above is able to store necessary information such that the information can be distinguished from another information.

While one embodiment of the invention has been described, the invention is not limited to the illustrated embodiment, but may be embodied with various modifications or replacement, without departing from the principle of the invention.

For example, the number of items of data stored in the storage device 32 in the present cycle of the routine may be added to the data in the storage region of the storage device 32, as shown in FIGS. 6A-6C. With this arrangement, data following the stored number of items of data can be determined as having been stored in the past.

Also, an identifying label may be added to each item of data, as shown in FIGS. 7A-7C. In this case, if there are N-pieces of storage regions in the storage device 32, N+1 different labels may be cyclically provided to the respective sets of data recorded at different times. It is thus possible to avoid an unfavorable situation where data stored in the past and data stored in the present cycle have the same label. FIG. 8 shows the manner in which N+1 different labels are provided cyclically in the case where the storage device 32 has N-pieces of storage regions. In FIG. 8, four different identifying labels are provided cyclically where the storage device 32 has three storage regions.

Furthermore, both of the identifying label and the condition of power supply from the battery 10 may be included in each item of data. This arrangement is advantageous because the condition of power supply from the battery 10 can be used not only for distinguishing the present data from the past data, but is also useful in the analysis of the cause of an accident, for example.

The present invention can be utilized in the automobile manufacturing industries and automobile parts manufacturing industries.

What is claimed is:

1. An event information collecting system installed on a vehicle, comprising:
    a status information acquiring device that acquires and generates vehicle status information;
    a control device connected to the status information acquiring device;
    a storage device connected to the control device;
    a main power supply that supplies electric power to the control device; and
    an auxiliary power supply that supplies electric power to the control device when supply of power from the main power supply is stopped, wherein
    the control device acquires the vehicle status information and a condition of the main power supply at the same time at predetermined sampling intervals, the acquired vehicle status information is associated with the acquired condition of the main power supply, the control device stores, in the storage device, the acquired vehicle status information generated from the status information acquiring device and the acquired condition of the main power supply, at the time of occurrence of a given event;
    wherein, when the vehicle status information and the condition of the main power supply are stored in the storage device, the control device stores the vehicle status information and the condition of the main power supply in a given region of a portion of the storage device while overwriting previous data present in the given region;
    wherein the condition of the main power supply includes an on-state in which electric power is supplied from the main power supply or an off-state in which no electric power is supplied from the main power supply, a point is distinguished between presently stored vehicle status information and previously stored vehicle status information as a point at which the condition of the main power supply changes from the off-state to the on-state in order to identify the stored vehicle status information after the point at which the condition of the main power supply changes from the off-state to the on-state as previously stored vehicle status information.

2. The event information collecting system according to claim 1, further comprising a voltage sensor used for grasping the condition of the main power supply.

3. The event information collecting system according to claim 1, wherein the control device stores, in the storage device, the vehicle status information generated from the status information acquiring device, the condition of the main power supply, and a number of items of data of the vehicle status information, at the time of occurrence of the given event.

4. The event information collecting system according to claim 1, wherein the control device stores, in the storage device, the vehicle status information generated from the status information acquiring device, the condition of the main power supply, and an identifying label that changes in cycles, at the time of occurrence of the given event.

5. The event information collecting system according to claim 1, wherein the control device determines whether the given event occurred, based on the vehicle status information.

6. A method for collecting event information on a vehicle, using a system including a control device, a storage device connected to the control device, a main power supply that supplies electric power to the control device, and an auxiliary power supply that supplies electric power to the control device when supply of power from the main power supply is stopped, comprising:

acquiring vehicle status information and a condition of the main power supply at the same time at predetermined sampling intervals, the acquired vehicle status information is associated with the acquired condition of the main power supply, the condition of the main power supply is either an on-state in which electric power is supplied from the main power supply or an off-state in which no power is supplied from the main power supply;

determining whether a given event occurred;

storing the acquired vehicle status information and the acquired condition of the main power supply in the storage device when it is determined that the given event occurred, when the vehicle status information and the condition of the main power supply are stored in the storage device, the control device stores the vehicle status information and the condition of the main power supply in a given region of a portion of the storage device while overwriting previous data present in the given region; and determining a distinguishing point between presently stored vehicle status information and previously stored vehicle status information as a point in which the condition of the main power supply changes from the off-state to the on-state in order to identify the stored vehicle status information after the point at which the condition of the main power supply changes from the off-state to the on-state as previously stored vehicle status information.

7. The method according to claim 6, wherein the vehicle status information generated from the status information acquiring device, the condition of the main power supply, and a number of items of data of the vehicle status information at the time of occurrence of the given event are stored in the storage device, when it is determined that the given event occurred.

8. The method according to claim 6, wherein the vehicle status information generated from the status information acquiring device, the condition of the main power supply, and an identifying label that changes in cycles at the time of occurrence of the given event are stored in the storage device, when it is determined that the given event occurred.

* * * * *

UNITED STATES PATENT AND TRADEMARK OFFICE
CERTIFICATE OF CORRECTION

PATENT NO. : 9,202,320 B2
APPLICATION NO. : 12/756255
DATED : December 1, 2015
INVENTOR(S) : Tomoki Nagao Page 1 of 1

It is certified that error appears in the above-identified patent and that said Letters Patent is hereby corrected as shown below:

In the specification

In Column 3, Line 40, delete "information event" and insert --event information--, therefor.

Signed and Sealed this
Twelfth Day of April, 2016

Michelle K. Lee
*Director of the United States Patent and Trademark Office*